US006715083B1

(12) United States Patent
Tovander

(10) Patent No.: US 6,715,083 B1
(45) Date of Patent: Mar. 30, 2004

(54) METHOD AND SYSTEM OF ALERTING INTERNET SERVICE PROVIDERS THAT A HACKER MAY BE USING THEIR SYSTEM TO GAIN ACCESS TO A TARGET SYSTEM

(75) Inventor: Lars A. Tovander, Plano, TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/416,752

(22) Filed: Oct. 13, 1999

(51) Int. Cl.[7] .............................. H04L 9/00; H04L 9/32
(52) U.S. Cl. ........................................ 713/201; 713/200
(58) Field of Search ........................... 713/201; 709/224

(56) References Cited

U.S. PATENT DOCUMENTS 5,440,723 A * 8/1995 Arnold et al. ................... 714/2
6,279,113 B1 * 8/2001 Vaidya ........................ 713/201
6,484,315 B1 * 11/2002 Ziese .......................... 717/173
6,606,316 B1 * 8/2003 Albert et al. ................ 370/389

* cited by examiner

*Primary Examiner*—Gilberto Barrón
*Assistant Examiner*—Grigory Gurshman

(57) ABSTRACT

Provided is a method and system for alerting an Internet service provider (ISP) having a server, or an Internet Connected Computer (ICC), that a potential hacker may be using it to attempt to access a target. The method detects a hacking event at the target, and reports the hacking event to a server located outside the target. The server may then report the hacking activity, including the identity of the hacker, to the target system's administrator, or another party, such as government entities. The system, which may be implemented as software, uses a monitor module and an action module to alert an Internet service provider that a hacker may be using it to attempt access to a target.

21 Claims, 2 Drawing Sheets

METHOD AND SYSTEM OF ALERTING INTERNET SERVICE PROVIDERS THAT A HACKER MAY BE USING THEIR SYSTEM TO GAIN ACCESS TO A TARGET SYSTEM

FIELD OF THE INVENTION

The present invention relates generally to the Internet, and more specifically to Internet security. More particularly still, the present invention provides a method and system of alerting Internet Service Providers (ISPs) that a hacker may be using their system to attempt to gain unauthorized access to a server.

BACKGROUND OF THE INVENTION

The Internet seems to be christened by Wall Street as the business wave of the future. This is because users of the Internet have the ability to quickly and accurately complete business transactions at remote and dispersed locations and with practically no transactional costs. Furthermore, access to the Internet is cheap, with many Internet computers actually being given away for free when Internet access is purchased for as little as fifteen dollars each month. Accordingly, it is estimated that by the year 2000 over half the households in the United States will have access to the Internet.

Because of widespread access to the Internet, people are using the Internet to access services for information on topics ranging from animals to zoos. When coupled with the vast amounts of university information already on the Internet, it can be seen that the Internet is beginning to fulfill its early promise as an educational clearing house of information. To take advantage of this rapidly growing community, many businesses, educational institutions, as well as national, state, and local governments, have connected to the Internet. Unfortunately, the ease with which users can gain access to the Internet also provides unscrupulous users easy access to information that another user does not desire to make publicly available when that information is maintained on a server that is connected to the Internet.

Access to the Internet is achieved through a computing platform, typically a server or a computer, that has a connection to an Internet Service Provider (ISP). Sometimes, a user may connect directly to the Internet through a modem or direct line (such as cable or ISDN) to the ISP. In a Local Area Network, a centralized computer, known as a server, is connected between one or more computers and the Internet. Accordingly, each computer in the LAN can access the Internet through the server.

A hacker is a person who accesses the Internet and seeks to infiltrate a target computer that is also on the Internet (hackers are notorious for reaching the Internet through a server at a university). The target may be a government computer, an educational institution computer or a business computer, for example.

Hackers have many motivations. Sometimes, a hacker may be interested in infiltrating a government computer to alter tax records or manipulate records of criminal convictions. A hacker may be interested in accessing an educational institution's databases to falsify grades or to fraudulently record credits. Other hackers may infiltrate a business in order to manipulate business orders or to transfer money from one account to another account. The dire consequences of hacking have created an entire industry aimed at preventing hacker infiltration into computers and LANs, and the manipulation of data by hackers on individual computers.

Systems designed to stop hackers typically operate as firewalls or as host based security systems. Firewalls are software programs designed to prevent unauthorized access into a target server or computer connected to the Internet. A firewall typically restricts remote access to the central server by requiring a password to be entered by those desiring remote access before access to the central server will be allowed. If an incorrect password is used too many times, the firewall program will automatically forbid that user from attempting another log-in. In addition, firewalls may also incorporate authentication or encryption technologies to provide for secure Internet transactions.

Host based security systems seek to protect the information stored in a specific target server or a computer connected to the target server (targeted computer). Thus, if a hacker successfully gets through a firewall security system and is able to log on to the central server, he may still face a host based security system. A host based security system will typically require a user to enter a password before allowing that user to have access to a specific program run on that computer or server. If an incorrect password is used too many times the host based security system may forbid that user from attempting another log-in or the host based security system may direct the firewall software to completely forbid access to that local area network connected through the central server.

Unfortunately, hackers may attempt multiple logins disguised as different users. For example, a hacker targeting a server may attempt multiple log-ins under one user ID, and then be rejected by the firewall software and forbidden from using that user ID for any further log-in attempts. However, the hacker then needs only to utilize a different user ID to try to gain access to the server again. Thus, a persistent and technologically sophisticated hacker can often gain access through a firewall. Once access is gained to the server, the hacker may attempt to gain access to a particular program where he may encounter a hostbased security system. Then, in a similar manner, he may attempt to use multiple user IDs to access that specific software and continue his misdeeds until his hacking urges are satisfied.

Therefore, there exists a need for a method and system of spotting hackers that may be using multiple account names or other techniques to gain access to a target, that that can identify the hacker. It would be advantageous for the method to operate in real time. The present invention provides such a method and system.

SUMMARY OF THE INVENTION

The present invention achieves technical advantages as a real time method and a system for detecting and reporting potential hacking on a Local Area Network (LAN) or the Internet (collectively "network"). The method generally detects a hacking event at a targeted system, and then sends an indication of the hacking event along the packet pathway towards the potential hacker's access point to the network. The method notifies the server targeted by the potential hacker, as well as other servers located in the network, of the hacking event and "fingerprints" packets originating from the potential hacker. The system generally comprises modules that may be implemented as software. One module detects hacking attempts by a potential hacker and sends reports about the hacking attempts to a second module which collects the reports and takes actions based on the reports. The disclosed invention identifies and thwarts potential hackers in real time, and generates an additional layer of protection in addition to firewalls and host-based security systems, thus making the Internet a more secure place to conduct information exchange.

In one embodiment, the invention is a method of alerting an Internet Service Provider (ISP) or an Internet Connected Server (ICC), that a potential hacker may be using it to attempt to gain unauthorized access to a targeted server. The method includes the steps of detecting a hacking event at the targeted server (target), and reporting the hacking event to a server located outside the target (which could be an ISP functioning as an access point for the potential hacker, or an ICC located in a packet pathway). In addition, the method reports potential hacker information to the target, and tags each packet originating from the potential hacker or an ISP or ICC associated with the hacker (which records the route the packet takes through the Internet). By tagging the packets, every ISP and every ICC that is identified by the tag as being in the packet pathway may be notified of the potential hacker and receive reports of the hacking events. Other sources may be notified of the potential hacker, such as local, state or federal authorities.

Furthermore, packets originating from the potential hacker may be fingerprinted to identify the packet as originating from a potential hacker. The fingerprint includes a risk indicator for associating a risk with the source of the packet. Servers may then make acceptance/rejection decisions about packets based on the fingerprint, the risk indicator, or other information received about the potential hacker.

While the invention is directed primarily at the Internet, it should not be read to be so limited. For example, the potential hacker and the target are often connected to the same server. In addition, the invention should not be read to limit detection and action functions to one particular location in the Internet. For example, any ISP, ICC or server in the packet pathway used by the potential hacker may reject a packet, or identify a source of potential hacking activity, which may be a single terminal, a LAN, an ISP, an ICC, or a server.

In another embodiment, the invention is a computer program for alerting an ISP that a hacker may be using it to attempt access to a target. The computer program generally includes a monitor module for tracking events at a potential target system, and an action module for collecting information and producing reports based on the information. The monitor module includes an authentication failure module for detecting failed log on attempts, and a notification module for notifying ISPs, ICCs, and other servers in the Internet of a hacking event. Likewise, the action module typically includes an information module for broadcasting information about a potential hacker to multiple interested parties, and a fingerprint module that uniquely identifies packets originating from a potential hacker and provides indicators of hacker activity, such as risk indicators.

In yet another embodiment, the invention is a system for providing security to a user of the Internet. The system includes an Internet service provider having an action module, and a target having a monitor module. The monitor module, which is typically executing in a server associated with a destination, detects intrusion attempts by a hacker and sends reports about the intrusion attempts to an action module. The action module, which is typically executing in each server associated with the packet pathway, collects the reports about intrusion attempts and then takes actions based on the reports.

BRIEF DESCRIPTION OF THE DRAWINGS

Other aspects of the invention, including alternative embodiments, are understood by reference to the following Detailed Description of a Preferred Embodiment, which can be better understood by reference to the drawings, in which.

DESCRIPTION OF THE PREFERRED EMBODIMENT

The present invention provides a method and a system for detecting and reporting hacking on the Internet or a Local Area Network (LAN). The method generally detects an attempt to gain entry into a network or computer that fails for any reason, and then sends an indication of the hacking activity to the packet transfer points located towards the potential hacker in the potential hacker's packet pathway.

The potential hacker's Internet Service Provider (ISP), or a computer functioning as a packet transfer point closer to the potential hacker, can then determine the specific of the hacking activity, and may determine if the potential hacker is in fact conducting hacking activities. For example, a packet transfer point may be able to determine if a single person is attempting to gain access to a target through multiple user identifications (IDs), and determine that this activity is characteristic of a hacker. The potential hacker is then finger printed to uniquely identify packets originating from him. In addition, authorities may be notified when necessary. Accordingly, the present invention provides the advantages of operating in real time to provide hacking information to ISPs and other packet transfer points, and thus provides an additional layer of protection to Internet users above firewalls and host based security systems.

AN EXEMPLARY SYSTEM

Figure 1:
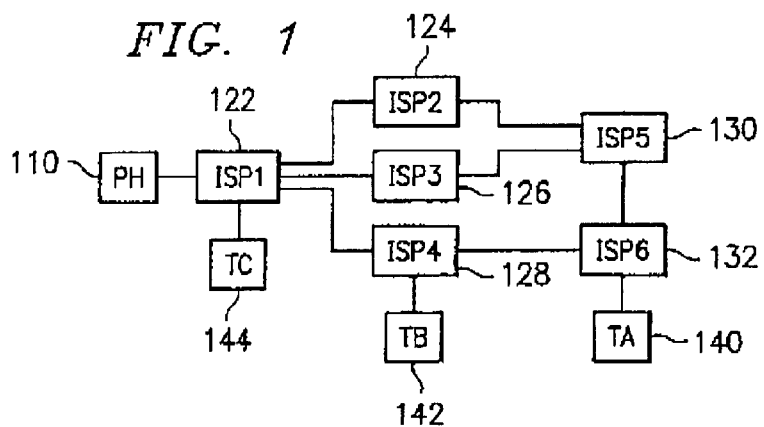
FIG. 1 is a high level block diagram of the Internet.

Though the present invention may operate in any computing platform, and may have application beyond the Internet, the invention is particularly suited for use in a LAN server, or a computer connected to the Internet. FIG. 1 is a high-level block diagram of the Internet. In the Internet, there is typically a computer defined as a packet source (source) and another computer defined as a packet destination (destination) (packets are discussed below). Typically, a computer may function as a source or a destination, and its classification as a source or destination is dependent only upon its present functionality.

The Internet user at the source gains access to the Internet through an ISP and communicates with a destination, typically in an attempt to get information from the destination. In FIG. 1, a source 110 is identified with the initials PH to identify it as a potential hacker. The source 110 connects to the Internet through an ISP (here through ISP1, 122).

The Internet itself is an interconnection of literally millions of ISPs and Internet Connected Computers (ICCs). ISP exist primarily to facilitate communication across the internet, and to provide access to the Internet. Common ISPs include Internet America, America On Line (AOL), and Flashnet for example. These ISPs link a user to the Internet through modems or other Internet connection devices, such as ISDN lines, for example. Likewise, ISP1–ISP6, 122–132, are likewise interconnected through Internet connection devices. It should be understood, that although only ISPs are shown in FIG. 1 that ICCs also inter-link within the Internet.

An ICC is often a computer that is connected to the Internet, and provides limited non-access related Internet functions, such as a web page provider. Though not designed to be a transfer point for packets, an ICC may serve as a pathway for Internet traffic, particularly when successfully infiltrated by a hacker. Accordingly, a hacker at the source 110 may gain access to the Internet through ISP1, 122, and attempt to hack into a destination.

Any computer 140–144 can be a target for a hacker operating from the source 110. In FIG. 1 computers 140–144 are designated TA, TB, and TC, to also identify them as: potential Target A 140, potential Target B 142, and potential Target C 144. Hereafter, computers 140–144 will be discussed as destinations. The computers 140–144 could be any targets LAN, ISP, ICC, or other server connected to the Internet, for example. Some common targets include government bureaus and bureaucracies, educational institutions and high schools, as well as businesses such as shipping companies and banks. For a hacker at the source 110 to infiltrate the computer 140, the hacker must gain access through multiple ISPs. By comparison, a hacker at the source 110 may try to infiltrate the computer 144/Target C through only one ISP 122 (indicating that ISP 122 could be a LAN server).

In the Internet, communication between a source and a destination is accomplished in units known as packets. Sometimes it is helpful to think of a packet as an envelope in a postal service. The source 110 is simply analogous to a post office box where the envelope is dropped. An envelope will travel through a local post office, then perhaps through routing post offices, and eventually to a post office from which a letter carrier will take the envelope to a mailbox, typically at a home or business. The post offices are analogous to packet transfer points such as ISPs, or Ices, and the mailbox at the home or business is analogous to a destination. Just as the envelope in our example is passed through one, or a plurality of post offices, a packet may travel through one or a plurality of servers, ISPs or ICCs.

The roads, flights, and other movements that an envelope takes to get from a source to a destination can be thought of as that envelope's pathway. Similarly, a packet has a pathway comprised of the ISPs, servers, Ices and interconnections that the packet travels through, and is called the packet pathway.

Figure 2:
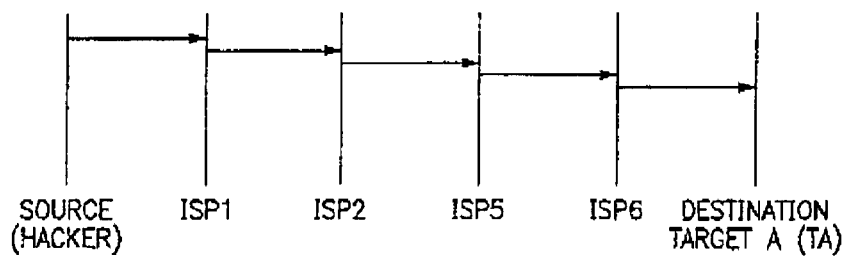
FIG. 2 illustrates packet pathway used by a packet to travel from the source to the destination.

FIG. 2 illustrates a packet pathway used to get a packet from the source 110 to the destination computer 140. First, a packet will travel from the source 110 to the ISP1, 122. Then, the ISP1, 122 forwards the packet to another ISP (which is typically chosen to minimize the time it takes for the packet to get from the source 110 to the computer 140). In FIG. 1 it is assumed that ISP1 has determined that the ISP2, 124 will provide the quickest route to the computer 140. Accordingly, ISP1 routes the data packet to ISP2, 124, and then, in a similar manner, ISP2 routes data packet to ISP5, 130. Likewise, ISP5, 130 routes the data packet to ISP6, 132 which then forwards the data packet to the computer 140.

If a firewall within the ISP6, 132 detects events associated with hacking activity, the ISP6, 132 could stop access attempts by the hacker. However, the hacker could then retarget ISP6 132 as a different user, or target another destination, such as Target D (computer 142), or Target C (computer 144). However, the present invention allows ISP6, 132 to identify multiple attempts to access computer 140 by identifying those packets passing through ISP1, 122. Then ISP6, 132 can notify ISP1, 122 of the hacking attempts by source 110, and then deny access to any packets originating from source 110, or ISP1,122, or any other ISP or ICC within the packet pathway.

Figure 3:
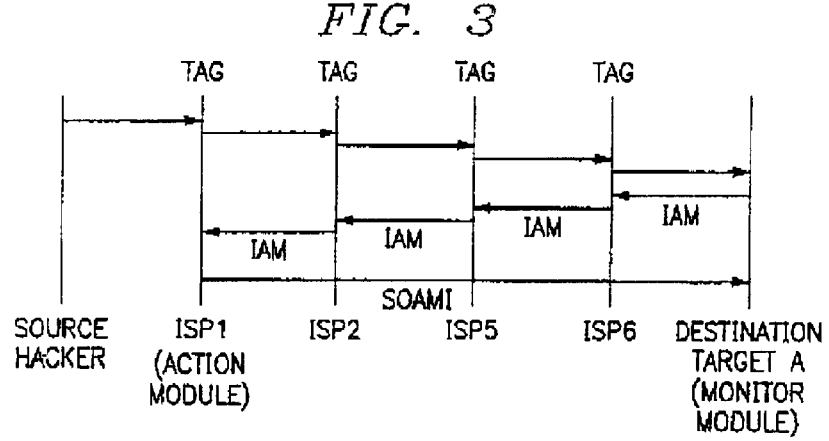
FIG. 3 illustrates one method of identifying the packet pathway tags the packet at each ISP through which it travels.

FIG. 3 illustrates a packet pathway where a packet is sent from the source 110 to the computer 140, and computer 140 detects a hacking indicator and reports the activity to ISP1, 122. FIG. 3 illustrates that one method of identifying the packet pathway between source 110 and computer 140 tags each packet at each packet transfer point the packet passes through. Accordingly, a packet can be tagged by an ISP, or ICC, for example.

Tagging a packet means that the packet is associated in some way with the ISP, the ICC, or other computer through which the packet is traveling. Accordingly, a packet travels from the source 110 where a potential hacker is located to the computer 140 (Target A) by passing from the source 110 to the ISP1, 122, then onto ISP2, 124, then to ISP5, 130, and then to ISP6, 132 as illustrated by the arrows pointing from left to right. Computer 140 has within it a monitor module (discussed in further detail below) which detects failed attempts to log onto the computer 140 or an application running on the computer 140. A failed attempt at a log on results in a reporting event.

The reporting event triggers in the monitor module an intruder alert message (IAM). The IAM message may be identified by a unique type of service (TOS) in the IP packet header. The IAM message could also be identified by a particular protocol, or a combination of TOAS and protocols. The IAM passes backward along the packet pathway. So, the IAM will travel from computer 140 to ISP6, then to ISP5, then to ISP2, and then to ISP1. However, the IAM message will not be transferred to the source 110 (and thus the potential hacker) so that the potential hacker will not be aware that his activities are monitored. The IAM message could be a new or slightly altered ICMP message configured according to Requests for Comment (RFC) number 2521. Furthermore, it should be noted that any ISP along the packet pathway of the IAM message may act independently from any other ISP receiving the IAM message. For example, ISP6 have received the IAM message from destination 140 and then forward the IAM message to ISP5 or ISP4 or a third party or some other destination and may also take other actions based on the reception of the IAM message. Accordingly, ISP5, ISP2 and ISP1 may send the IAM message on to other ISPs or take other actions as well.

Information about a hacker or intruder can also be sent from an ISP to the targeted computer. Accordingly, FIG. 3 illustrates that a System Operations Additional Maintenance Information (SOAMI) message is sent from ISP1, 122 to computer 140. The SOAMI message may contain information used to identify the potential hacker such as the name of the ISP the hacker is using, the phone number of the potential hacker, the name of the network administrator, or the address and phone number needed to report the hacking attempt, for example. Furthermore, ISP1, 122 can keep a log of IAM messages and other received data used by law enforcement agencies or other interested parties. Decisions to report or otherwise act on hacker information are made by an action module located within ISP1, 122. Other action modules located in other ISPs along the packet pathway can take similar actions.

Figure 4:
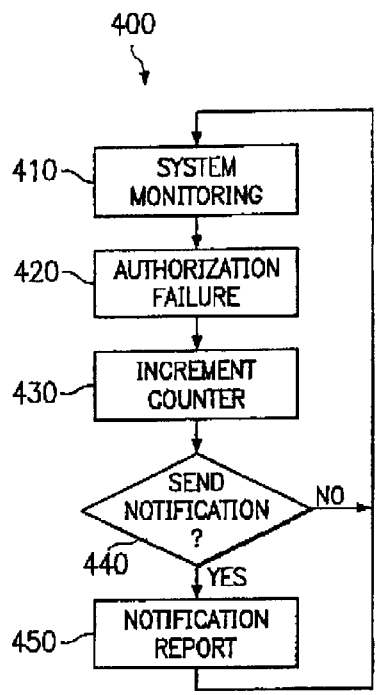
FIG. 4 is a flow diagram illustrating the functioning of the monitor module.

FIG. 4 is a flow diagram illustrating the functioning of the monitor module. The monitor module evaluates packets arriving at a destination, and activity at a destination, detects hacking events, and reports hacking events to the appropriate Internet service providers, ICCs, or other device or party. Accordingly, in a system monitoring step 410, the monitor module examines incoming data packets for signs of hacking activity which are known as hacking events. Though other hacking events are detectable, the monitor module of FIG. 4 specifically seeks to detect authorization failures. Accordingly, in an authorization failure step 420, a potential hacker has attempted to log on to the system and his or her log on attempts has failed. This authorization failure may be detected in an authorization failure module, for example.

Next, in an increment counter step 430, a specific counter assigned to that user ID, or to an ISP used by the potential hacker, is incremented. Then, in a send notification query 440 the monitor module 400 checks to see if the counter has been incremented above some predetermined threshold value. If the counter has not yet incremented above that predetermined threshold the send notification query 440 routes the process back to the system monitoring step 410 where the monitor module 400 waits for another failed attempt at a log on by that user (or other chosen indicator of hacking activity). If however, the monitor module 400 in the send notification query 440 detects that the counter value has now incremented above the predetermined threshold value, a report is made by a notification module in a notification report step 450. The notification report step reports the hacking event to the ISPs, ICCs, and other servers, which are located along the packet pathway by using a notification packet which may be an IAM for example.

Figure 5:
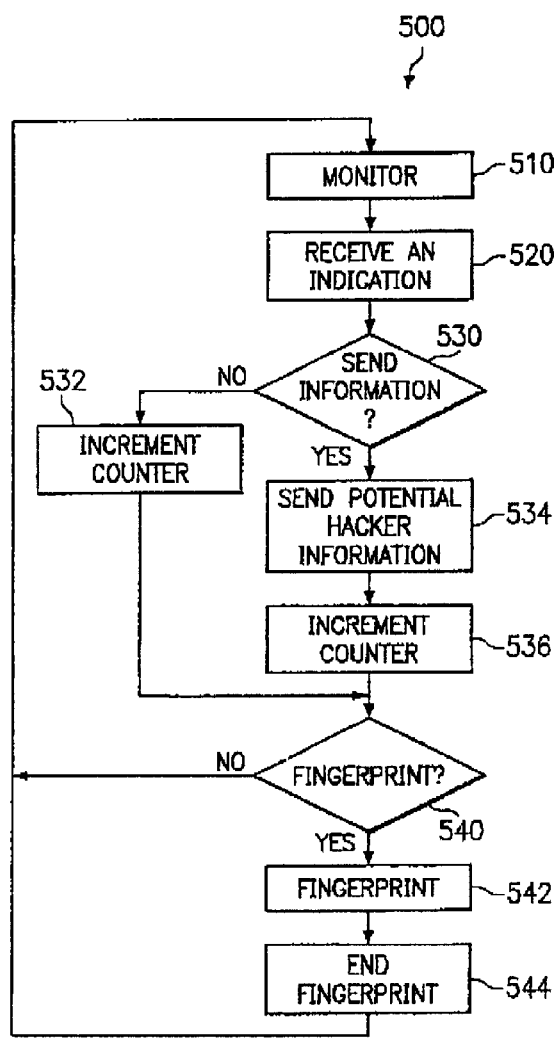
FIG. 5 illustrates the performance of an action module located within an ISP.

Any ISP may take action based on the receipt of a report from a monitor module. FIG. 5 illustrates the performance of an action module located within an ISP such as ISP1, 122 in FIG. 1. Generally, the action module 500 will be in a monitor state 510 where the monitor module 500 is awaiting the receipt of an IAM message. Then, in a received indication step 520, the action module 500 receives an IAM message from a destination.

Next, in a send information query 530, the action module checks to see if various intruder information needs to be sent to different destinations. If no information needs to be sent at the receipt of an IAM message a counter is incremented in an increment counter step 532. However, if it is determined that intruder information needs to be sent to the original or other destinations, the action module proceeds to a send intruder information step 534. The send intruder information step 534, when implemented as an information module, reports hacker information to various destinations and entities. For example, hacker information may be sent to the destination targeted by the hacker as a system operations additional maintenance information (SOAMI) message as discussed above. Additional hacker information may be sent to the ISP that is functioning as the access point for the potential hacker. In addition, the potential hacker information could be sent to an ICC, or a third party such as the police or law enforcement, an Internet authority or a local phone company provider. In any event, once the information module has sent the appropriate potential hacker information to the appropriate destinations and entities, the action module 500 proceeds to increment the counter in an increment counter step 536.

After the counter has incremented in an increment counter step 532 or the increment counter 536 the action module proceeds to a fingerprint query 540. The fingerprint query determines if it is appropriate to assign a unique code to each packet associated with the potential hacker. As the name fingerprint implies, the fingerprint generated by the ISP uniquely identifies either the hacker, the ISP through which the hacker gained access to the Internet, or an ICC through which the hacker is channeling packets. If the fingerprint query determines that fingerprinting is not appropriate at this time, the action module 500 proceeds to return to the monitor step 510. If, it is determined in the fingerprint query 540 of data packets originating from the potential hacker is desirable, the action module 500 proceeds to a fingerprint step 542.

The fingerprint step 542 is implemented through a fingerprint module which uniquely identifies each packet associated with a potential hacker and may assign a risk indicator for associating a risk with the source of the packet. A risk indicator could hold a count of the number of log on attempts by the potential hacker. Logically, accepting a packet that has a failed log on attempt count of one hundred thirty five is more risky that accepting a packet from a source with a failed log on attempt count of three. Of course, failed log on attempts occurring in the past time greater than some threshold period should be cleared from the record to prevent the accumulation of failed log on attempts which could mislead a destination to deny access to a legitimate Internet user.

Thus, when the fingerprint module is activated, any data packets originating from the potential hacker (or an associated ISP or ICC) identified in the IAM message will be fingerprinted by the ISP executing the fingerprint module before those packets are routed any further toward the intended destination. As fingerprinting takes up valuable processing resources, it is desirable that fingerprinting be discontinued after a certain period of time. Accordingly, the action module will eventually progress to a fingerprint step 544 after the completion of a typically predetermined probationary period. In the end fingerprint step 544, the action module simply ceases to uniquely identify those packets originating from the source identified by the IAM message. Next, the action module 500 proceeds to the monitor step 510.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

I claim:

1. A method of detecting and reporting a hacking event on a network, comprising the steps of:

detecting a hacking event at a targeted system connected to said network;

determining a network path between said targeted system and an originating system that generated said hacking event;

tagging a packet from said originating system; and sending a first message backward via the path traversed by said hacking event, and each connected server between said originating system and said targeted system receives and passes said first message to the next server in the path until reaching a server providing an access point for said originating system, wherein said first message includes information regarding said hacking event.

2. The method of claim 1 further comprising the step of reporting information regarding said hacking event to the targeted system.

3. The method of claim 2, wherein said network is the Internet and said server is an Internet Service Provider (ISP).

4. The method of claim 2 wherein the reporting step reports the hacking event to a third party computer, said third party computer being responsible for network security.

5. The method of claim 1 further comprising the step of tagging a packet generated by said originating system for recording the route the packet takes through the network.

6. The method of claim 1 further comprising the step of fingerprinting a packet received during said hacking event to identify the packet as originating from said originating system.

7. The method of claim 6 wherein the fingerprint comprises a risk indicator associated with the source of the packet.

8. The method of claim 1 further comprising the step of stopping said message at said server providing said access point for said originating system.

9. The method of claim 1 wherein said originating system said targeted system are connected to the same server.

10. The method of claim 1 further comprising the step of rejecting subsequent packets originating from the originating system.

11. The method of claim 10 wherein the step of rejecting a packet is carried out based on a fingerprint associated with said packet.

12. The method of claim 1, further comprising the step of said targeted system receiving a message from said server providing an access point for said originating system, wherein said message includes information to identify said originating system including: server name, address, administrator name and telephone number.

13. The method of claim 1 further comprising the step of said server providing an access point for said originating system sends a message to said targeted server with information for identifying said originating system.

14. A computer program within a computer usable medium for detecting and reporting a hacking event on a network, comprising:
   a monitoring module for detecting a hacking event at a targeted system connected to said network; and
   an action module responsive to an output from said monitoring module for
      determining a network path between said targeted system and an originating system that generated said hacking event;
      tagging a packet from said originating system; and
      sending a first message backward via the path traversed by said hacking event, wherein each connected server between said originating system and said targeted system receives and passes said first message to the next server in the path until reaching a server providing an access point for said originating system,
      wherein said first message includes information regarding said hacking event.

15. The computer program of claim 14 wherein the monitor module comprises an authentication failure module.

16. The computer program of claim 14 wherein the monitor module comprises a notification module.

17. The computer program of claim 14 wherein the action module comprises an Information module.

18. The computer program of claim 14 wherein the action module comprises a fingerprint module.

19. A system for providing security to a user of the Internet, comprising:
   a monitor for detecting and reporting a hacking event on a network,
   a computer program associated with said monitor for:
      detecting a hacking event at a targeted system connected to the Internet;
      determining a network path between said targeted system and an originating system that generated said hacking event;
      tagging a packet from said originating system;
      sending a first message backward via the path traversed by said hacking event, and each connected server between said originating system and said targeted system receives and passes said first message to the next server in the path until reaching a server providing an access point for said originating system,
      wherein said first message Includes information regarding said hacking even; and
      responsive to receiving said first message said server associated with said originating system sending a second message forward along said network path containing information regarding said originating system.

20. The computer program of claim 14, further comprising a fingerprint module for uniquely identifying each packet associated with said originating system and for assigning a risk indicator to the originating system.

21. The system of claim 19, further comprising a fingerprint module for uniquely identifying each packet associated with said originating system and for assigning a risk indicator to the originating system.

* * * * *